July 1, 1930. C. G. KELLER 1,768,958
VEHICLE WHEEL
Filed May 12, 1926 2 Sheets-Sheet 1

INVENTOR
Charles G. Keller
BY
ATTORNEYS

July 1, 1930.  C. G. KELLER  1,768,958
VEHICLE WHEEL
Filed May 12, 1926  2 Sheets-Sheet 2
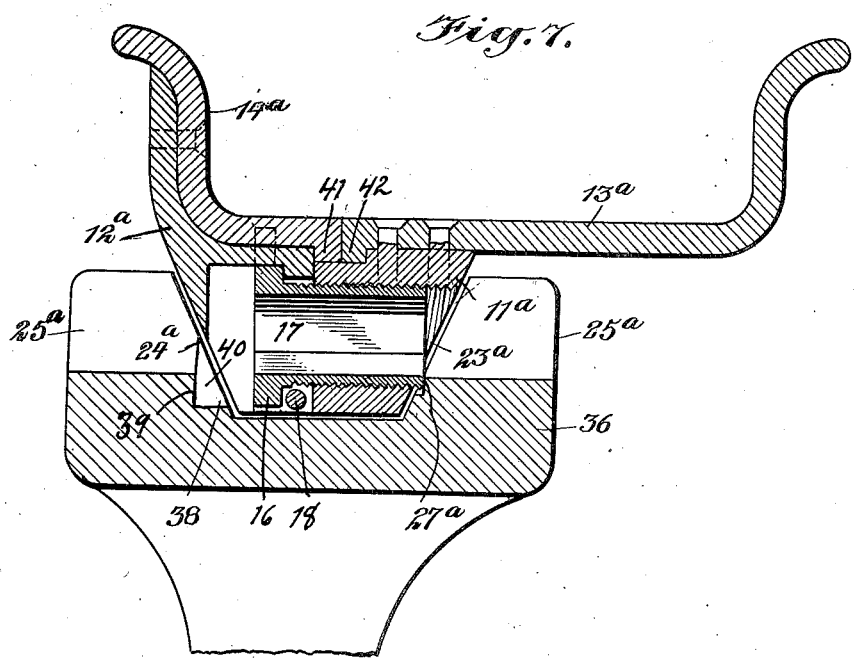
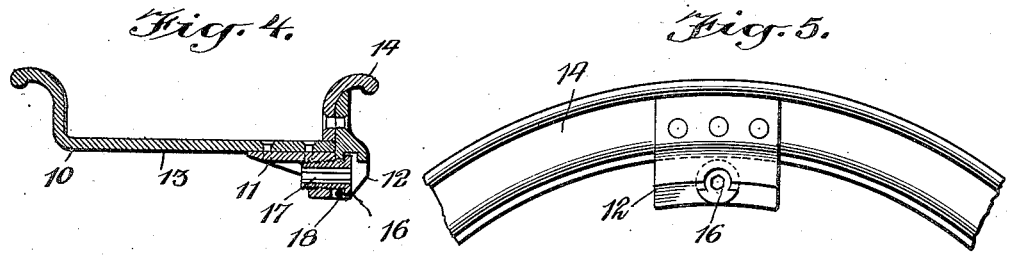
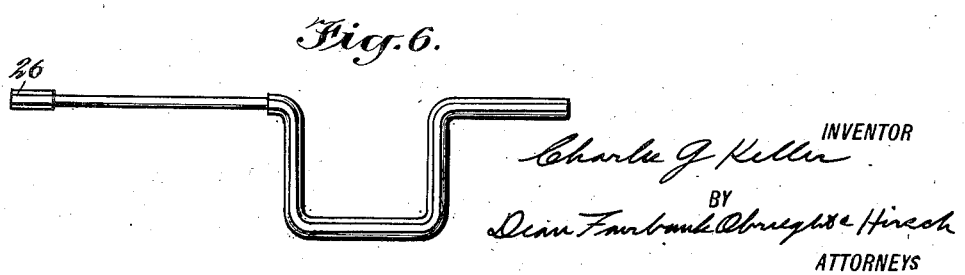
INVENTOR
Charles G. Keller
BY
ATTORNEYS Patented July 1, 1930

1,768,958

UNITED STATES PATENT OFFICE

CHARLES G. KELLER, OF POUGHKEEPSIE, NEW YORK

VEHICLE WHEEL

Application filed May 12, 1926. Serial No. 108,501.

This invention is an improvement in vehicle wheels, and relates more particularly to the means for detachably securing the tire-carrying rim on the rim supporting part of the wheel.

In its preferred embodiment the rim has two rows of inwardly extending projections adapted for gripping or locking engagement with the rim support, the two rows of projections being relatively movable axially to effect the gripping or locking action. The projections preferably have cam surfaces for engaging corresponding surfaces of the rim supporting parts of the wheel.

As one important feature I provide the rim with positively acting members for effecting or permitting said relative axial movement of the rows of projections, and so design and construct these members that they are carried by the rim both in the attached and removed positionings of the rim. Thus there are no separate clamping or retaining parts which are to be applied or removed in changing one tire carrying rim for another on the wheel.

These members are preferably carried by the pairs of projections and comprise connecting bolts which may be rotated to force the projections apart or draw them together, or to permit or prevent the separation of the rim sections by the action of the expanding pressure of a pneumatic or other tire.

As a further feature, the bolts are so designed and so mounted that they act to positively disengage said cam surfaces in case the latter become rusted together or jammed.

As a further feature the bolts are so designed and mounted that they act to positively lock the rims against creeping when the rim sections are spread apart.

As another feature I provide means whereby the bolts of the inside rim of a twin tire wheel may be tightened or loosened without removing the outer rim. This may be accomplished by a special form of tool, even though the bolts are in alignment. By making the bolts hollow, they may be operated from either end, or by projecting the tool through one bolt into the other.

In a preferred embodiment I directly connect the spoke ends to the rim and do not employ or provide any felly. I apply the rim by first slipping it on to the wheel axially up to a stop, with the several projections between successive spokes, and then rotating it to a stop to bring the rim to final position with the projections in registry with the coacting surfaces on the ends of the spokes. By effecting a relative axial movement of the projections they are caused to have gripping or locking engagement with the spoke ends to prevent both axial and rotational movement of the rim in respect to the other wheel parts.

Other important features and advantages of my invention will be pointed out hereinafter, or will be apparent from the following description and the accompanying drawings.

In the accompanying drawings:

Fig. 4 is a transverse section through the rim, removed from the wheel.

Fig. 5 is a side view of a portion of the rim.

Fig. 6 is a side view of a tool for operating the screw bolts, and

Fig. 7 is a section showing a modified form in released position.

Figure 1:
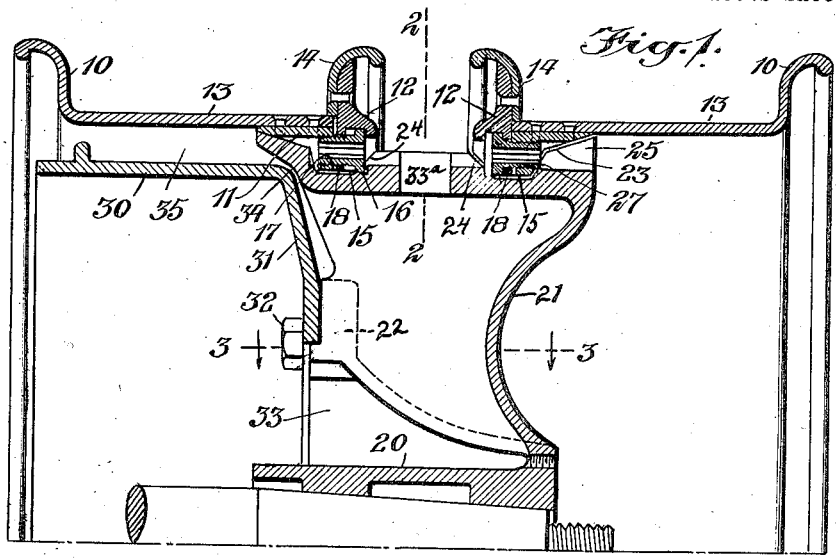
Fig. 1 is a central radial section of one half of a wheel, said section being taken on the line 1—1 of Fig. 2, the left hand rim being in clamped position, and the other rim being in released position.
Figure 2:
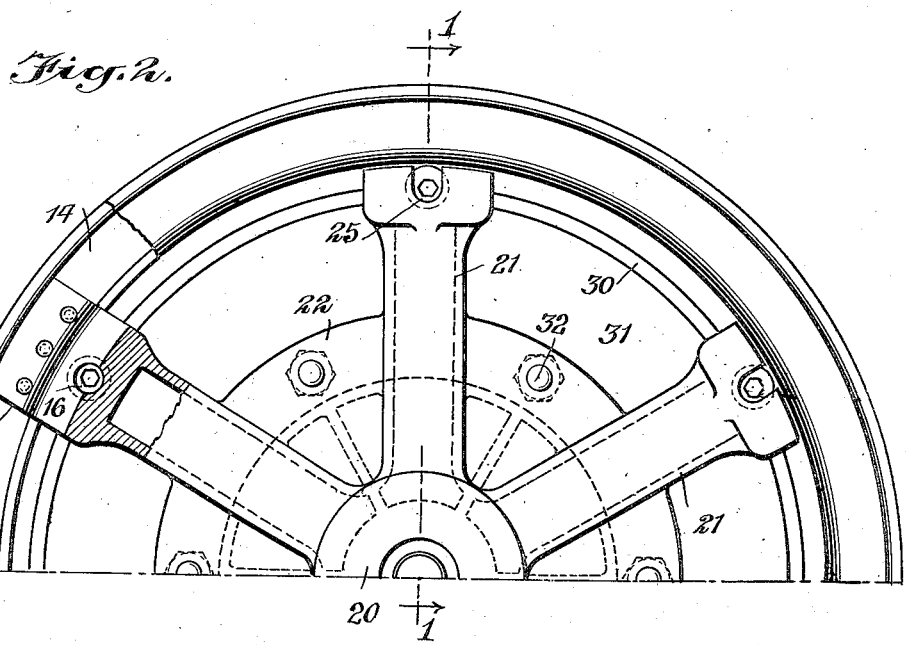
Fig. 2 is an outer face view looking axially of the wheel, a portion being broken away on the line 2—2 of Fig. 1.
Figure 3:
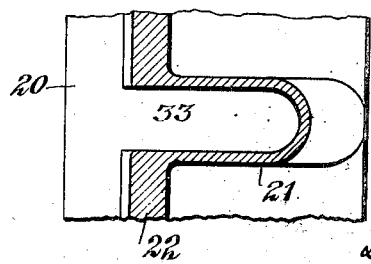
Fig. 3 is a section on the line 3—3 of Fig. 1.

In the construction illustrated in Figs. 1 and 2 there are provided two removable rims 10 each having side flanges adapted to engage with the beads of a pneumatic tire. The general shape and proportions of the rim form no portion of my invention, as these may be varied in accordance with the character of the tire, whether solid or pneumatic, which is to be carried by the rim. The rim carries two annular rows of inwardly extending projections 11 and 12 which are relatively movable axially for locking or gripping the rim on the other part of the wheel. The rim is preferably formed of a main section 13 which includes one of the rim flanges, and the main web or body portion of the rim, and a separate section 14 which forms the other flange of the rim. The projections 11 and 12 are formed as forgings which are riveted to the inner periphery of the two rim parts. There are a plurality of these forgings constituting the projections, the number being dependent upon the number of points at which it is desired to grip or lock the rim in position.

The projection 12 is provided with a chamber 15 adapted to receive the head 16 of a bolt, and the projection 11 has a threaded aperture 17 into which the bolt extends. The head 16 preferably has limited endwise movement in the chamber 15 so that upon rotating the bolt the head may engage with one end of the chamber and force apart in axial directions the rim sections and the corresponding rows of projections. By rotating the bolt in the opposite direction the head will engage with the other side of the chamber 15 and will act to force the two rows of projections toward each other and to reduce the space between the two flanges of the rim. Lost motion of the head 16 in the chamber 15 is not essential. The chamber 15 may open inwardly so that in the original assembly the bolt may be moved sideways into the chamber and may thereafter be held in place by a transverse pin 18 so that when the bolts are rotated to such an extent as to entirely leave the apertures 17, the two rim sections 13 and 14 can be separated for the removal or replacing of a tire, and the bolts will be permanently carried by the rim section 14, so that they cannot become lost or misplaced.

In the wheel structure which I employ for carrying the rim there is preferably no felly employed and the body of the wheel is of spider type. As illustrated, it includes a hub 20 with spokes 21 integral therewith and connected for a limited distance outwardly from the center by webs 22. The spokes, webs and hub are preferably formed integral. The spokes are preferably of U-shape in cross-section and the webs 22 connect one edge of the channel or U of one spoke to the opposed edge of the next adjacent spoke. Thus the webs do not extend across from one edge of a spoke to the opposite edge of the same spoke.

Each spoke at its outer end is provided with a pair of cam surfaces 23 and 24 corresponding to the surfaces of the projections 11 and 12. In mounting the rim on the wheel the rim is moved axially to the required distance, while the projections are disposed between adjacent spoke ends.

The rim is then rotated to bring the projections into proper position opposite the surfaces 23 and 24 on the spoke ends and the bolts are then rotated to separate the projections 11 and 12 and cause them to interlock with or bind against the surfaces 23 and 24. If the rim carry a pneumatic tire which normally exerts axially spreading pressure against the two flanges of the rim, the rotation of the bolt may act merely to permit the tire to separate the rim sections rather than to positively effect such separating action. The cam surfaces of the projections 11 and 12 wedge on the cam surfaces 23 and 24 and lock the rim in place. At the same time the bolts in being rotated, move into locking engagement in recesses in the spoke ends so as to prevent any slipping or movement of the rim in case the tire becomes flat or the projections are not forced on to the cam surfaces with sufficient pressure.

The bolts are preferably made hollow and the spoke ends are so constructed that the bolts of both rims may be actuated from the outer side of the wheel. As shown, each spoke end has an aperture 25 through which a tool may be inserted to the interior of the bolt of the outer rim to lock or unlock the rim. By providing a tool of the type shown in Fig. 6, the hexagonal end 26 of the tool may be inserted into the bolts of the outer rim to lock or unlock this outer rim or it may be projected all the way through the several outer bolts and into the interior of the inner bolts to tighten or loosen the inner rim.

Preferably the cam surfaces 24 which engage the lugs or projections 12 are steeper than the cam surfaces 23 which engage the lugs 11 and the main section 13 of the rim. The bolts are of such width that when rotated to draw the two rim sections together and release the rim they may project beyond the end of the opening 17 and engage with a shoulder 27 at the end of the cam surface 23. Thus further rotation of the bolt will positively pull the projection 11 off the cam surface 23 in case the two are jammed or rusted together. Thus the bolts serve not merely for locking or unlocking the rim, but also serve for positively freeing the rim and facilitating the easy rotation thereof.

By making each rim of a wide main section and a narrow flange, and by placing the two rims on the wheel with the narrow or flange sections together, the spoke ends may be comparatively short in respect to the total axial length of the wheel. The spoke ends need be of only sufficient length to provide the spacing between the two rims and to engage the projections 11 of the two rims. Thus, there is a large chamber provided within the rim toward the medial line of the vehicle. This provides ample space for a brake drum.

As illustrated I provide a brake drum 30 which is disposed closely adjacent to the inner surface of the inner rim and has an inwardly directed flange 31 which may be secured to the web 22 by bolts 32. This flange does not extend all the way into the hub, but leaves an opening 33 leading to the passages within the several spokes. Thus, when the wheel is rotated, air may enter each spoke through the opening 33 and will be forced by fan action through the apertures 33ª in the end of the spokes, and also through the narrow space 34 between the edge of the brake drum and the outer end of the spoke, and thence through the space 35 between the brake drum and the rim. The air sucked in by the fan action comes along the inner surface of the drum. This continuous flow of air when the wheel is rotating, thus cools effectively the outer and inner surfaces of the brake drum.

In Fig. 7 I have shown an alternative construction in which there is employed only a single rim. The exact construction of rim shown in Fig. 1 may be employed with the wheel construction shown in Fig. 7. The rim illustrated in Fig. 7 has a main rim section 13ª and a flange section 14ª, but instead of having these meet at the edge of the web of the rim I provide the flange section 14ª with a portion of the base. The rim sections may have inwardly directed flanges 41 and 42 to which the lugs or projections 11ª and 12ª may be riveted or welded, or with which they may be integrally formed. The two projections are secured together by the same form of securing bolts as that hereinbefore described. The spoke end has a head portion 36 presenting opposed cam surfaces 23ª and 24ª against which the cam surfaces of the projections may engage when these projections are separated.

The groove between the cam surfaces 23ª and 24ª is preferably centrally disposed in the peripheral surface of the spoke end in head 36. The end of the tubular screw bolt may be forced against the shoulder 27ª to positively disengage the projection 11ª from the cam surface 23ª in case these parts become wedged or rusted together. Ordinarily this will not be necessary with such sharp angles as are illustrated in Fig. 7.

The head 16 of the hollow screw bolt may enter a recess 38 to positively prevent the rim from creeping when the cam surfaces are in engagement, and in this respect acts the same as the bolt shown in Fig. 1. It does not engage the bottom 39 of the recess, and said recess has side walls 40 to engage opposite sides of the end of the bolt.

The head 36 has grooves 25ª through either of which the tool shown in Fig. 6 or any other suitable tool may be inserted to engage with the non-circular passage or recess in the securing bolt to rotate the latter and disengage or permit engagement of the locking or gripping surfaces.

The only features of the construction illustrated and hereinbefore described, which are claimed herein are those relating to the means employed for detachably securing the rim in place. Other features not herein claimed are claimed in copending applications.

Having thus described my invention, what I claim as new, and desire to secure by Letters Patent is:

1. A vehicle wheel having reversely inclined cam faces on the periphery thereof, a rim formed of two axially movable sections each having a series of projections engaging said faces to limit relative axial separation of the rim sections, and a plurality of clamping bolts for forcing said projections together to free them from said cam faces, said bolts having portions engaging said wheel to positively prevent creeping of the rim when said projections are in engagement with said cam faces.

2. A vehicle wheel having reversely inclined cam faces on the periphery thereof, one of said faces having a recess therein, a rim having two annular rows of projections relatively movable axially and engaging with said faces to support the rim on the wheel, and clamping bolts for moving said projections axially in either direction, said bolts entering said recesses when said projections are in engagement with said faces whereby creeping of the rim is positively prevented.

3. A vehicle wheel having a pair of reversely inclined cam faces on the periphery thereof, a rim formed of two axially movable sections each having a series of projections engaging with said faces to limit axial separation of the rim sections and supporting said rim on said wheel, and a plurality of clamping bolts for forcing said rim sections toward or from each other, said bolts engaging with said wheel to prevent creeping of said rim circumferentially along said cam faces when said sections are spread apart and out of engagement with said wheel when said sections are forced together.

4. A vehicle wheel having a plurality of spokes each presenting a recess or groove in its outer end and extending peripherally along said outer surface of said end, a rim formed of two sections each having a row of projections thereon and the projections of the two rows forming pairs for entry into said grooves or recesses upon a limited rotational movement of the rim in respect to the spokes, and a plurality of bolts for connecting said pairs of projections, the projections of one row having recesses receiving the heads of the bolts and the projections of the other row having threaded apertures engaging with said bolts whereby the rim sections may be forced toward or away from each other upon rotation of said bolts, and each of said spokes having a portion engaged by a corresponding one of said bolts for positively preventing creeping of the rim when said rim sections are forced away from each other.

5. A vehicle wheel having two pairs of rim supports, each including reversely inclined surfaces, a pair of rims on said supports, each of said rims including two auxially movable sections, each having a series of projections engaging said inclined surfaces to limit relative axial separation of the rim sections, and a plurality of clamping bolts carried by juxtaposed projections of said rims for effecting relative axial movement of the rim sections, the bolts of one of said rims being of tubular form, whereby a tool may be projected through said last mentioned bolts into the bolts of the other rim for operating said last mentioned bolts.

6. A vehicle wheel having two pairs of rim supports, each including reversely inclined surfaces, a pair of rims on said supports, each of said rims including two axially movable sections, each having a series of projections engaging said inclined surfaces to limit relative axial separation of the rim sections, and a plurality of clamping bolts carried by juxtaposed projections of said rims for effecting relative axial movement of the rim sections, certain of said projections having axial passages therethrough, and the bolts of one of said rims being of tubular form, whereby a tool may be projected through said last mentioned bolts into the bolts of the other rim for operating said last mentioned bolts.

7. A vehicle wheel having reversely inclined cam faces on the periphery thereof, a rim formed of two axially movable sections each having a series of projections engaging said faces to limit relative axial separation of the rim sections, and a plurality of clamping bolts for forcing said projections together, said bolts each having one end thereof positively engaging said wheel to positively separate said projections from one of said faces during said forcing of the sections together.

8. A vehicle wheel having reversely inclined cam faces on the periphery thereof, a rim formed of two axially movable sections each having a series of projections engaging said faces to limit relative axial separation of the rim sections, and a plurality of clamping bolts for forcing said projections together, said bolts each having one end thereof positively engaging said wheel to positively separate said projections from one of said faces during said forcing of the sections together, and each having the opposite end engaging said wheel to prevent creeping of said rims when said sections are spread apart.

Signed at New York in the county of New York and state of New York, this 6th day of May, A. D. 1926.

CHARLES G. KELLER.